United States Patent [19]

Broek

[11] 3,784,789

[45] Jan. 8, 1974

[54] FRACTION COMPUTER FOR MULTI-COMPONENT TRACE

[75] Inventor: Jan A. Vanden Broek, Ann Arbor, Mich.

[73] Assignee: Transidyne General Corporation, Ann Arbor, Mich.

[22] Filed: June 22, 1972

[21] Appl. No.: 265,419

[52] U.S. Cl......... 235/61.6 A, 235/151.35, 235/183, 235/92 R, G06g/7/48

[51] Int. Cl.... G06k 11/02, G06f 7/48, G06f 15/20, G06g 7/12

[58] Field of Search.................. 235/61.6 A, 61.6 B, 235/92 NT, 151.35, 183; 340/146.3 AC, 146.3 AE; 233/61.6 H

[56] References Cited

UNITED STATES PATENTS

| | | | |
|---|---|---|---|
| 3,706,877 | 12/1972 | Clifford | 235/151.35 |
| 3,614,408 | 10/1971 | Watkin | 235/183 |
| 3,412,241 | 11/1968 | Spence | 235/183 |
| 3,185,820 | 5/1965 | Williams | 235/92 R |
| 3,555,260 | 1/1971 | Karohl | 235/151.35 |
| 3,253,273 | 5/1966 | Allen | 235/61.6 A |
| 3,695,764 | 10/1972 | Delmas | 235/151.35 |
| 3,553,444 | 1/1971 | Tong | 235/151.35 |

*Primary Examiner*—Daryl W. Cook
*Assistant Examiner*—Robert M. Kilgore
*Attorney*—Fisher, Krass, Young and Gerhardt

[57] ABSTRACT

An electronic system for computing the integrals of various fractions of the time varying electrical output of a scanning densitometer provides that output to a graphic recorder, an analog-to-digital converter and to a slope detector which generates signals representing the boundaries of various fractions of the signal. This detector output is also provided to the recorder to produce a curve representing the amplitude variations of a densitometer signal with marks at the boundaries. The outputs of the analog to digital converter and the slope detector are provided to a shift register. An operator generates correction signals based on an observation of the recorder trace representing desired changes in the boundaries as determined by the slope detector. The densitometer output of the shift register is integrated over time periods controlled by the boundary output of the shift register as manually corrected.

17 Claims, 6 Drawing Figures

FRACTION COMPUTER FOR MULTI-COMPONENT TRACE

BACKGROUND OF THE INVENTION

1. Field of Invention

This invention relates to computers for calculating the integrals of various fractions of a time-varying characteristic, and more particularly to such a system which automatically detects the boundaries between fractions, and includes means for operator interaction to modify the integration periods from those determined by the automatic means.

2. Prior Art

A number of different analytical instruments are used in diverse fields to scan come characteristic of a physical specimen to determine the exact composition of the specimen. For example, the various protein components of a blood sample may be anaylzed by electrophoresis which involves spacial separation of the various components under the influence of an electric field. Similarly, a chromatographic or nuclear resonance anaylsis may be made of a chemical specimen to determine its range of components. It is often desired to obtain numerical values representative of the various components of the specimen as determined by such anaylsis. This may be done manually by plotting a curve representative of the time variations in the output of the detecting scan and then manually separating the plot into fractions representing the various characteristics and determining the integrals of each component by graphic techniques.

In order to automate the process computers have been developed which accept an electrical signal having a characteristic which varies over a period of time as a function of the sifnificant characteristic of the sample, and which automatically detect a certain feature of this characteristic, such as a peak value of a change in slope, and then integrate the values of the signal over time periods which are controlled by this automatic feature detection. By way of example, a system of this type is disclosed in Williams et al. U.S. Pat. No. 3,185,820. An amplitude modulated signal representing the output of a chromatograph is integrated and also provided to a slope detector which senses the point of separation between two fractions. Each time such point is detected the value of the integral is stored and the integral count is returned to zero.

A system of this type is completely automatic and operates in a fully satisfactory manner if the separations between the fractions which it is desired to analyze are associated with a readily identifiable feature of the time plot of the characteristic. For example, if the fractions are always defined by the passage of the slope of the plot of the characteristic through zero the automatic apparatus functions accurately to recognize that characteristic and control the integration process. However, certain analytical processes product output scans wherein the fractions of interest are often, but not always, associated with an easily detected characteristic. For example the output tract provided by the electrophoretic analysis of a complex protein specimen such as blood may include curves wherein the separation between two particular fractions may evidence itself as a change in slope rather than a change in direction of slope as do the boundaries between most of the components. Or, a pair of adjacent trace components separated by a change in direction of slope may represent only a single component of the physical specimen, i.e., one which produces a "twin peak."

While it might be possible to program a general purpose computer to make the more complex decisions necessary to the generation of the desired integral computation, required with these complex curves the high cost of this approach has lead to an alternate development wherein an operator makes all of the fraction boundary decisions based on his observation of a plot of the input curve and provides this information to the integrating unit which receives the electrical representations of the signal. In this system the input time varying electrical signal is provided to both a recorder and to a delay unit. The sheet of paper carrying the plot of the curve is passed beneath a cursor. The distance between the printer and the cursor is sufficient to give an operator time to study the curve that emerges and make decisions relative to the fraction boundaries. When a point on the curve representing a boundary, as determined by the operator, passes under the cursor, a switch is pushed providing a signal relative to the boundary. The delayed output signal is provided to an integrator in timed relation to the passage of the curve under the cursor so that when the button is pressed the integral count is returned to zero. Simultaneously, a second marker produces an appropriate blip on the chart paper to identify the boundaries of the fractions which are being calculated.

Since the fraction boundary used by the integrator occurs at the exact point of the curve that is under the cursor when the operator presses the button the curve must be generated quite slowly and the operator must exercise great care to press the button at the proper instant. Operators consider this a very demanding and tiring operation and it is of course highly subject to human failure.

The fully automatic slope detection system will often separate the fractions in a less satisfactory manner than an experienced technician. The fully manual system requires continuous operator attention and exposes to the danger of human error a large number of decisions which could be easily made by a machine, as well as a smaller percentage of more difficult decisions which practically require manual intervention.

SUMMARY OF THE PRESENT INVENTION.

The present invention is addressed to a fraction computer which is more satisfactory in operation than either of these units and is not substantially more expensive. Broadly, the present system includes automatic detection of the change of slope or other feature of the time varying input characteristic and the provision of means for communicating thse machine decisions to an operator and allowing the operator to modify these machine decisions before the integrals are actually calculated.

A system formed in accordance with one embodiment of the invention operates by making the automatic fraction decision at the time the primary curve is imprinted on the paper, as in the fully automatic system. The printer operates to produce a blip on the curve at the automatically selected boundary to inform an operator of a decision. Both the incoming signal and the signal representative of the automatic boundary decision are then delayed or temporarily stored while the operator inspects the recorder curve and the machine generated fraction boundary decisions. As in the manual system, the trace paper is drawn under a cursor and the operator has the option of pressing a button while a marked boundary point passes under the cursor which will negate the decision made by the automatic circuitry that the point represents a boundary between two fractions. This will prevent the previously stored signal associated with that automatic boundary decision from controlling the operation of the integrator. There is no special timing required to make this delete decision, as the delete button need only be pressed while the blip moves under the cursor. It may be pressed a safe time before that occurs.

The operator also has the option of adding a boundary decision to those automatically made by depressing a second button when the appropriate point on the curve moves under the cursor. This is analogous to the totally manual system and a degree of care must be exercised in the timing of depressing the button. This manually introduced boundary decision is then provided to the integrator along with the automatic decisions which have not been deleted. In most cases the operator will not find it necessary to either delete or add a boundary decision and accordingly, the present system is not taxing on the operator.

In an alternate embodiment of the invention, also subsequently described in detail, a section of the curve is printed and automatic boundary decisions are made, as in the previous embodiment, but only for a determined time period of the scan signal. The signal is stored in a first-in-first-out memory having sufficient capacity to retain the entire signal which occurs during the particular period as well as boundary decisions made during that period. After this section of the curve has been generated, the unit stops and the operator may inspect the curve at his convenience and mark the trace paper at a predetermiend location with indications that he wants to add or delete one of the automatically generated boundary decisions. After this inspection is completed the trace paper is moved under an optical reader in timed relation to the output of the electrical signal from the memory. The optical reader acts to detect marks made by the operator and uses them to delete from or add to the stored boundary decisions which are provided to the integrator. This embodiment has the advantage of eliminating active operator-machine interaction during the scanner process, allowing the scanner process to be speeded up far beyond the maximum rate possible if the operator must make real time decisions.

In this latter system the total area under the curve is calculated as the signal is provided to the shift register. The shift register is digital and an analog-to-digital conversion is conducted to process the input signal. The integration simply takes the form of summing the digital values at regular intervals. This total integral is provided to an arithmetic unit in the integrator so that, as each fractional integral is computed, it may be expressed as a precent of the total integral.

The signal processing, including the delay or storage of the input signal and the computation of the integrals could be achieved on a purely analog basis but the economics of electronic components make the digital implementation more attractive at the present time. Accordingly in both preferred embodiments of the invention the input analog signal is sampled at regular intervals and digital representations of the instantaneous amplitudes of the input signal are generated and fed into a shift register. At the output end of the shift register, after the delay, the numbers are converted into serial pulse trains having numbers of pulses equal to the values of the digital representations. These pulses are accumulated in a counter and the count reached during an integrating period is representative of the integral of the signal. The accuracy of the arrangement may be increased by decreasing the sampling period.

The systems of the present invention are thus inexpensive to implement and provide a more desirable mode of operation than the prior art systems.

Other objectives, advantages and applications of the present invention will be made apparent by the following detailed description of two preffered embodiments of the invention. The description makes reference to the accompanying drawings in which.

Figure 1:
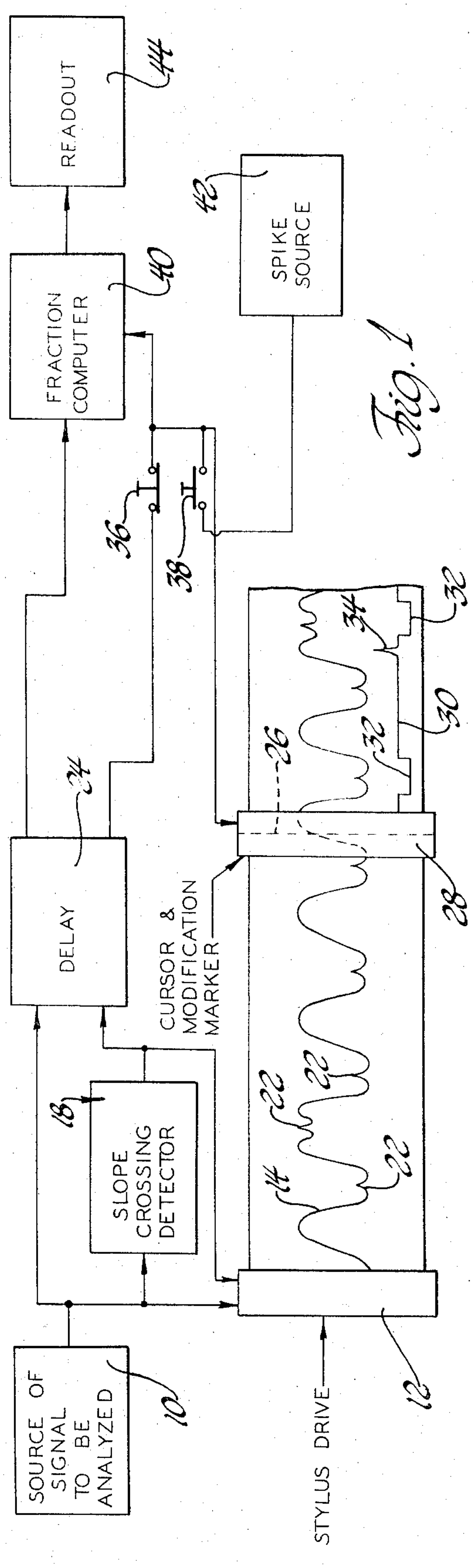
FIG. 1 is a partially block, partially schematic drawing of a first embodiment of the invention wherein the operator may generate modification signals for the automatic boundary decisions as the trace passes under a cursor.

Referring to the first embodiment of the invention broadly illustrated in FIG. 1, the time varying input signal that the present invention accepts and generates the integrals of various actions of, is typically amplitude modulated although it may be modulated in another respect such as frequency or phase. It is illustrated as being provided from a source 10 which may typically be a densitometer scanning a protein separation generated by electrophoretic techniques. The output signal has an amplitude which varies as a function of the instantaneous density of the trace being scanned. As has been noted, other typical signal sources may be chromatigraphs, nuclear resonance analyzers and the like.

The signal to be analyzed in unit 10 is provided to the stylus drive 12 of a single axis plotter. The plotter produces a curve 14 on a continuously moving section of the plotter paper 16 which represents the amplitude variations of the output of source 10. The signal to the source 10 is simultaneously provided to a slope crossing detector 18 which effectively detects changes in the direction of the differential of the variations of the output signal from the source 10. Each time the direction of the slope of the signal changes from negative to positive a pulse is provided on line 20 to the stylus drive 12 producing a blip 22 on the curve 14. The output from source 10 is simultaneously provided to a serial short-time memory or delay unit 24. The delay unit also receives and stores the outputs of the slope crossing detector 18. Thus the delay stores the electrical representations of the curve 14 and the blips 22. The time required for passage of a signal through the unit 24 is equal to the time required for a point on the curve 14 to move from the stylus drive 12 to a hairline 26 on the cursor 28 which extends from the path of the chart paper 16 a spaced distance from the stylus drive 12.

The cursor 28 includes a chart marker which generates a trace 30 on the chart paper 16 as it passes below unit 28. The trace 30 consists of a straight line interrupted by sections 32 extending below the axis line and by blips 34 extending above the line. The sections 32 are generated when an operator manually depresses a normally closed "delete" button 36. The blips 34 are produced when a boundary decision is received from the delay unit 24, that is in synchronism with the blips 22, or when the operator depresses a normally open "add" button 38. The delete button 36 may be depressed by the operator while a blip 22 representing a boundary decision made by the slope crossing detector 18 passes beneath the hairline 26 of the cursor. The "delete" button is connected between that portion of the output of the delay unit 24 representing the delayed slope crossing detector signal and a fraction computer 38. Depressing the switch 36 prevents the delayed slope crossing signal from being provided to the fraction computer. Similarly the "add" switch 38 is connected between the fraction computer 40 and a source of voltage spikes 42. When the add switch 38 is depressed a spike resembling a slope crossing detector output is provided to the fraction computer and to the modification marker.

The fraction computer receives the delayed output of the unit 10 and effectively generates the integrals of sections of that signal between limits represented by the occurrence of slope crossing pulses as modified by the delete button 36 and the add button 38. The fraction computer may simply be an integrator which is reset to zero each time a boundary decision is received, or it may be a more complex digital unit which stores integrals representative of the various fractions, generates the integral representative of the total value of the curve, and provides an output expressing the fractions as percentages of the total area of the curse. These signals are provided to an appropriate read-out unit 44 which may be printer.

In use, the operator observes the curve 14 with the blips 22 as it is generated by the recorder 12. If the boundary decisions made by the slope crossing detector 18 are satisfactory he simply allows them to pass under cursor. If he recognizes an automatically made boundary decision as erroneous he may correct it by pushing the "delete" button while the blip 22 representing that decision moves under the cursor. This will prevent the stored signal representing that boundary decision from being provided to the fraction computer 40. If he desires to add a boundary decision at any point he simply presses the "add" button 38 while that point on the curve 14 passes beneath the cursor 26 and the appropriate signal is provided to the fraction computer causing it to terminate the integral at that point.

Figure 2:
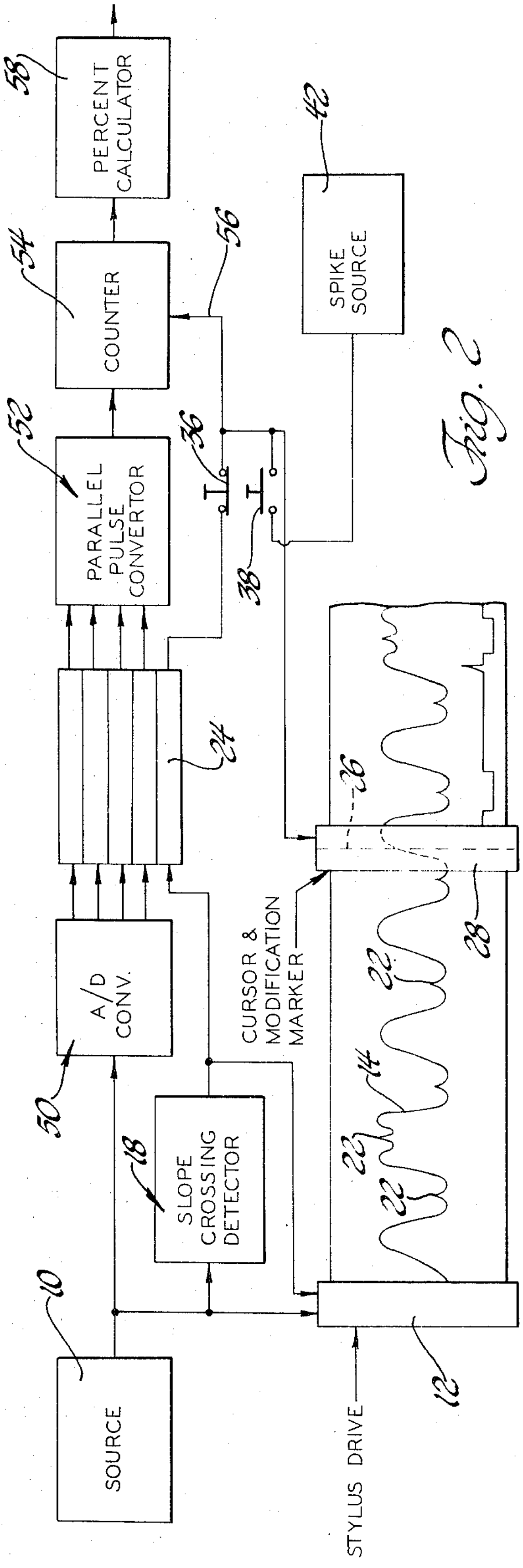
FIG. 2 is a more detailed block diagram of the embodiment of FIG. 1.

FIG. 2 illustrates the system of FIG. 1 in somewhat more detail. The signals from the source 10 are converted from analog form to digital form by a converter 50 before being provided to the delay unit 24. The digital outputs of the converter 50 are provided to the delay unit 24 at regular intervals in parallel form. The outputs of the slope crossing detector are provided to another channel of the digital delay line 24.

The outputs of the delay line 24 representing a digital representation of the instantaneous amplitude of the output of the source 10 are provided to a parallel/pulse converter 52 which effectively generates trains of pulses for each parallel number, the train having a number of pulses equal to the parallel number. Each pulse train is provided to a serial counter 54 forming part of the fraction computer. They are counted until a signal is received on line 56 representing the slope crossing detected output of the delay line 24 as modified by the operator actuated switches 36 and 38. Each time one of these signals is received the count is provided to a percentage calculator 58 forming a part of the fraction computer and the count is restarted at zero. The percentage calculator 58 stores the numbers representing the integrals of the fractions as provided by the counter 54 and sums them and provides output signals to the read-out unit 54 representing the percentage that each fraction represents of the total value.

Figure 3:
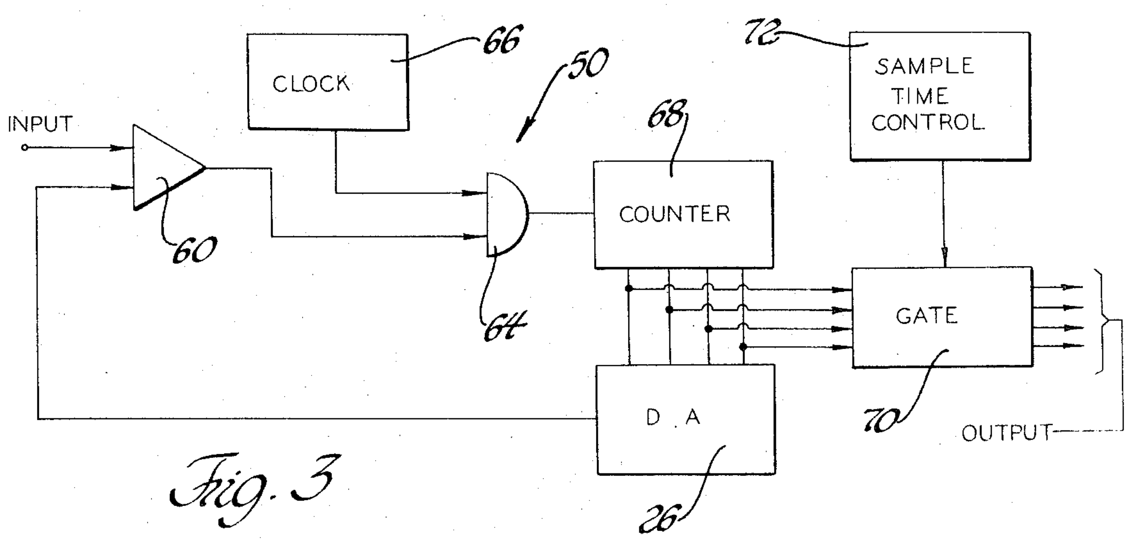
FIG. 3 is a partially schematic, partially block diagram of the analog digital converter employed in the embodiment of FIG. 1.

The analog-to-digital converter 50 is illustrated in more detail in FIG. 3. The input from the source 10 is provided to a comparator unit 60 it is compared with the amplitude of a voltage provided by a digital-analog converter 62. As long as the two are unequal a signal is provided to an AND gate 64 which allows pulses produced by a clock 66 to be provided to a digital counter 68. The value contained in the counter is reconverted to analog form by the converter 62. Thus at steady state, the count within the counter 68 is a direct function of the amplitude of the input signal. The parallel output of the counter is provided to a gate 70 which feeds the delay line 24 each time it is opened by a sample time control unit 72. By this arrangement, parallel numerical indications proportional to the instantaneous amplitudes of the input signal are regularly provided to the delay line 24.

Figure 4:
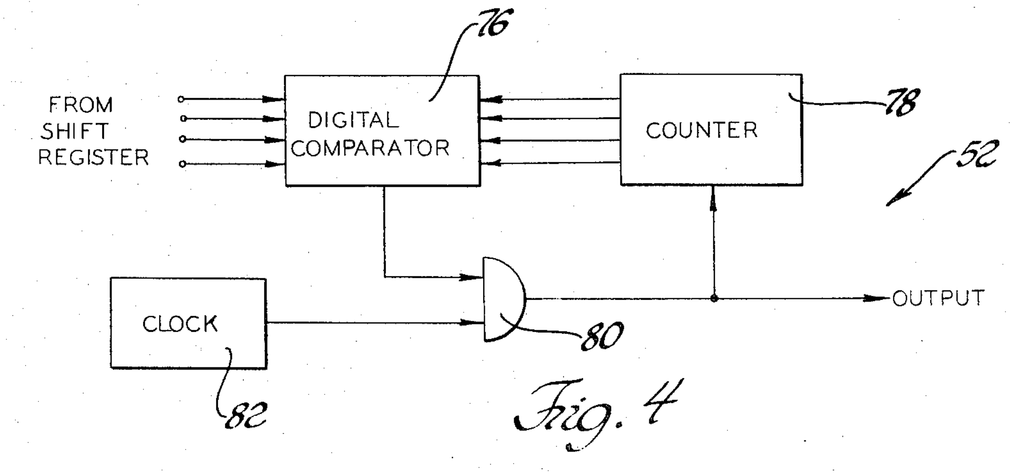
FIG. 4 is a partially schematic, partially block diagram of the parallel pulse converter employed in the embodiment of FIG. 1.

The parallel/pulse converter 52 is illustrated in block form in FIG. 4. The signals from the delay unit 24 representing the digital representations of the instantaneous value of the amplitude of the source 10 are provided to a digital comparator 76 along with the parallel output of a counter 78. As long as the count in the counter is less than the value received from the shift register an AND gate 80 allows the pulse output of a clock 82 to be provided to the counter. These pulses also represent the output of the unit. Thus, each time a parallel number is received from the shift register a number of pulses are provided by the gate as an output and to the counter until the count within the counter equals the parallel number and the counter is reset.

Figure 5:
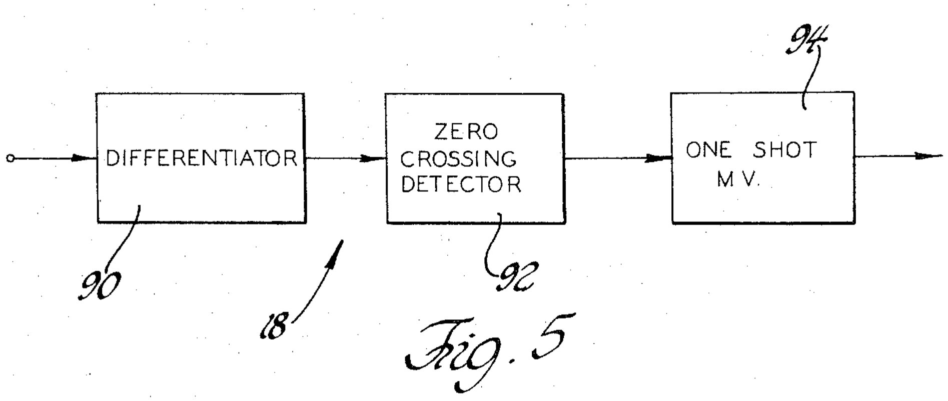
FIG. 5 is a block diagram of the slope crossing detector employed in the embodiment of FIG. 1.

The slope crossing detector 18 is illustrated in block form in FIG. 5. The input signal is first provided to a differentiator 90 which generates an analog signal proportional to the slope signal. A zero crossing detector 92 of conventional design detects the change and sign of the differential and provides a signal to a one-shot multiplier 94 which provides an output pulse. This system is of the same type disclosed in the aforesaid Williams patent. It should be recognized that in other embodiments of the invention other characteristics of the time varying input signal such as a change in slope of the signal might be used to automatically define boundaries of various fractions.

Figure 6:
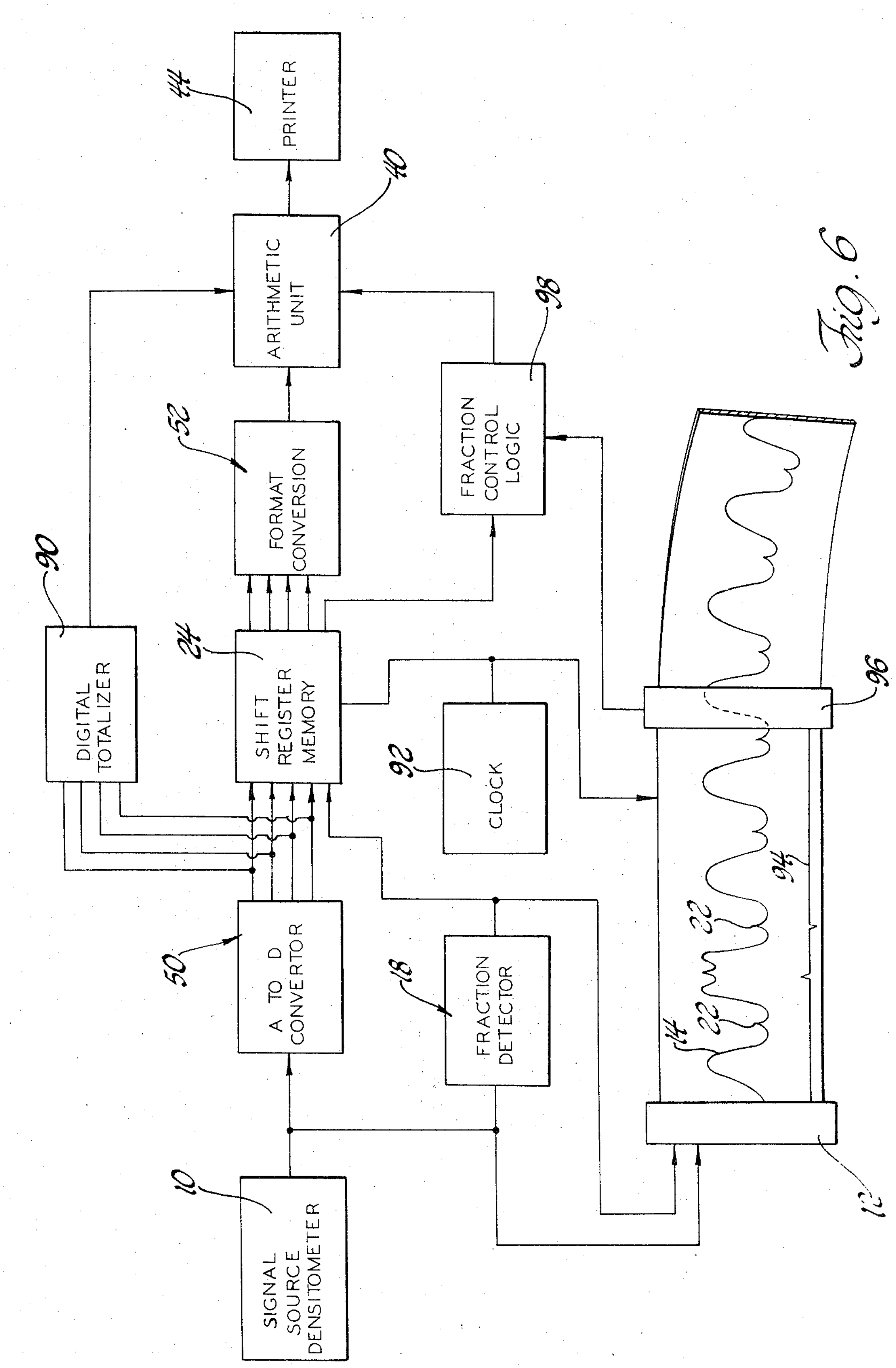
FIG. 6 is a partially block, partially schematic diagram of a second embodiment of the invention wherein the operator's modification signals are generated for a limited length of the output curve on a delayed time basis.

FIG. 6 illustrates an alternate embodiment of the invention. As in the first embodiment, the signal from the source 10 is provided to an analog-digital converter, to a slope crossing detector 18 and to the stylus of a single axis recorder 12. At regular intervals the digital outputs of the converter 50 are provided to a memory 24 taking the form of a shift register along with the outputs of the slope crossing detector 18. The digital outputs of the converter 50 are also provided to a summing unit 90 which generates the total integral for the section of signal being analyzed and provides that to the arithmetic unit 40 so that the values of the fractions may be expressed in terms of a percentage of the total integral. The signal 14 generated by the recorder 12 is the same as that employed in the first embodiment.

This system differs from that of the first embodiment in that the signal output 10 is only analyzed for a predetermined period which is equal to the capacity of the delay unit 24. This may for example be equal to 10 inches along the chart paper 16. A clock 92 controls the operation of the system so that the drive is halted after the shift register has become filled. The same unit could control the operation of the signal source 10. After that section of the signal has been analyzed an operator may observe the trace 14 and the fraction boundaries 22, he may then delete or add fraction decisions by making marks respectively above and below a line 94 at points directly below particular points in the curve. This marking is analogous to the depressions of the "delete" and "add" buttons 36 adn 38 in the first embodiment. After the operator has completed his markings the chart is restarted and passed under an optical marking reader 96 which detects the marks made on the line 94. The signals from the optical reader are provided to a fraction control logic unit 98 which receives the outputs from the shift register 24 representing the boundaries, modifies them appropriately and provides them to the arithmetic unit 40.

As previously noted this embodiment allows the operator to take as much as required to analyze a curve before making corrections without unnecessarily slowing the operation of the source 10.

Having thus described the invention, I claim:

1. A system for calculating the integrals of a plurality of fractional components of a signal having a time-varying characteristic comprising: graphic display means for receiving said signal and for providing a graphic representation of instantaneous values thereof as a function of time; means for receiving said signal as it is provided to the display means and storing a representation of the time-varying characteristic of said signal; means for automatically generating second electrical signals in timed relation to the occurrence of a preselected feature of the time-varying characteristic of said signal; manually controllable means for generating third signals representing desired modifications to said second signals; and integrator means operative to receive the output of said means for storing a representation and said second and third signals and to integrate values of the characteristic so stored over periods controlled by said second and third signals.

2. The system of claim 1 wherein the time varying characteristic comprises the amplitude of the signal and the preselected feature of the time-varying characteristic comprises a change in sign of the differential of the amplitude.

3. The system of claim 2 wherein said third signals are generated in timed relation to the occurrence of selected of said second signals and act to modify the action of said second signals and said integrator means.

4. The system of claim 2 wherein said third signals are operative to either add or delete one of said second signals from the signal provided to the integrator.

5. The system of claim 1 wherein the graphic display means includes means for providing a graphic representation of said third signal.

6. The system of claim 1 wherein said second signals are provided to said graphic display means so that the graphic representation includes a representation of said second signals.

7. The system of claim 6 wherein said third signals are provided to said graphic display means so that said graphic representation includes representation of said third signals.

8. A system for receiving a first electrical signal which has a time-varying characteristic and for computing the time intervals of various fractions of said characteristic, comprising: display means for receiving said first signal and for generating a graphic display of a characteristic of the signal as a function of time; memory means for receiving said first signal and for storing it; means for receiving said first signal and for generating a second signal representative of the occurrence of a particular feature of said characteristic; manually actuatable means for modifying the characteristics of said second signal to produce a third signal; and integrator means operative to receive the output of said memory and said third signal and to integrate the output of the memory over periods controlled by said third signal.

9. The system of claim 8 wherein said second signal is provided to said memory means and said third signal represents the output of said memory means as modified by said manually actuatuable means.

10. The system of claim 8 wherein a predetermined section of said first electrical signal equal to the amount of the first electrical signal which may be stored in said memory means is generated at a single time.

11. The system of claim 10 wherein the manually actuatable means for modifying the characteristics of said second signal to produce a third signal includes means for manually marking certain signs on said display means and means for reading the signs so marked and for generating electrical signals as a function of said signs.

12. A system for receiving a first signal having a time-varying characteristic and for calculating the integrals of various fractions of said signal, comprising: display means for receiving said first signal and for generating a graphic display of variation of said characteristic as a function of time; delay means for receiving said first signal; means for receiving said first signal and detecting the occurrence of a distinctive feature of said characteristic to generate a second signal; manually actuatable means for providing a third control signal; and integrator means for receiving the output of said delay means for generating values of the characteristic of said signal over periods which are controlled by the second and third signals.

13. The system of claim 12 wherein said time varying characteristic is the amplitude of said first signal, the distinctive feature of said characteristic is the change in sign of the differential of said first signal and said third control signal consists of a plurality of elements generated in timed relation to the occurrence of said first signal, at least certain of said elements occurring simultaneously with particular elements of said second signal relative to said first signal, and said certain elements controlling said integrator means so as to override the effect of said particular elements of said second signal.

14. The system of claim 12 wherein said second signal is provided to said display means and acts to generate a graphic display of said second signal superimposed on the graphic display of the variation of the characteristic of the first signal.

15. The system of claim 12 wherein said second and third signals are provided to said display means and act to generate the graphic display of said second and third signals in timed relation to the graphic display of said first signal.

16. The system of claim 12 wherein the first control signal is generated by manually marking said graphic display and providing said marked graphic display to an optical reader which generates output signals as a function of the display markings.

17. The system of claim 12 wherein the time varying characteristics of said first signal are periodically sampled and converted into parallel digital form, said delay means stores said first signal in said parallel digital form and wherein the integrator means includes means for generating trains of pulses having a number of pulses equal to each digital number provided by the delay and for summing said pulses.

* * * * *